(No Model.)
J. H. LEWIS.
APPARATUS FOR SECURING ANIMALS WHILE BEING SHOD.
No. 305,202. Patented Sept. 16, 1884.
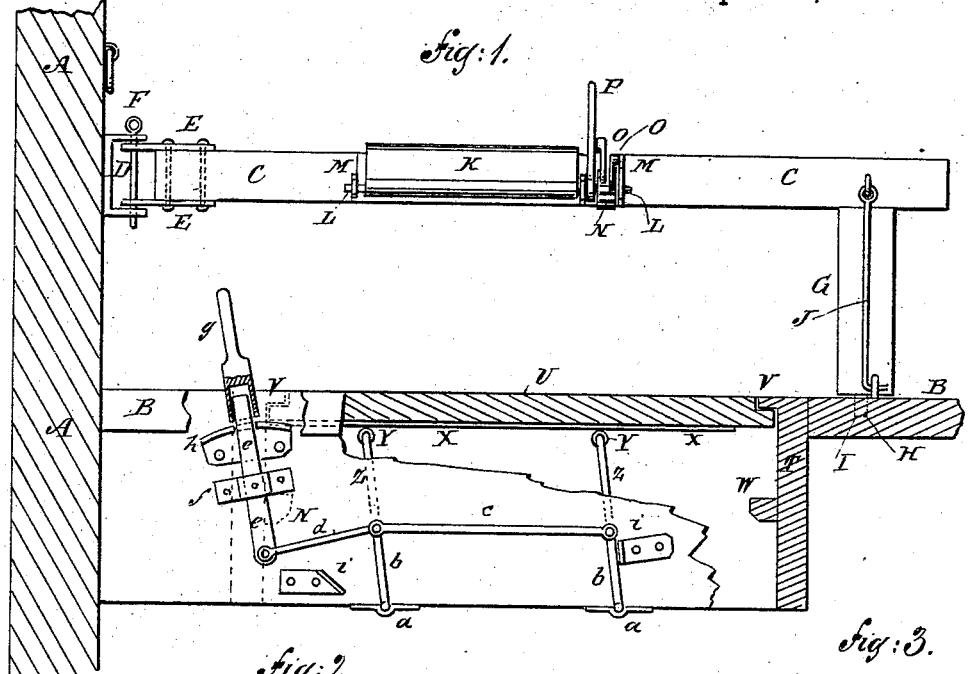
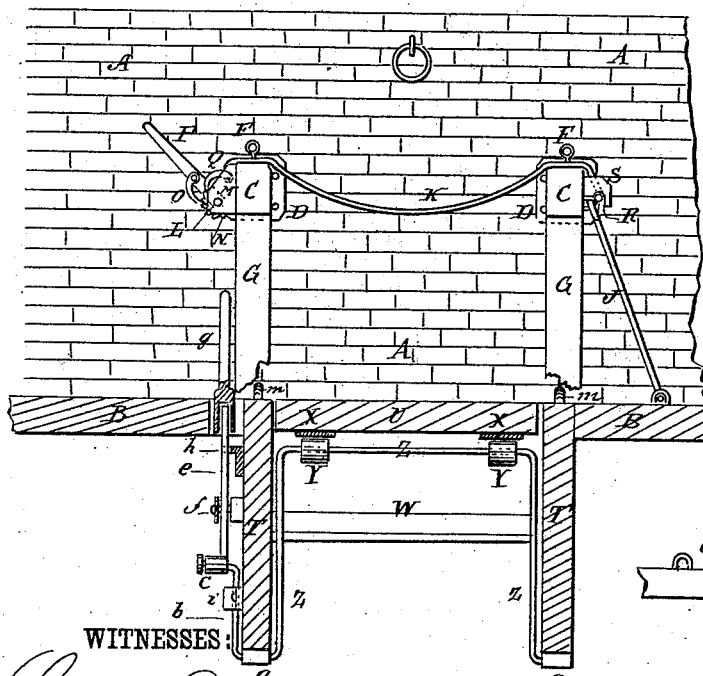
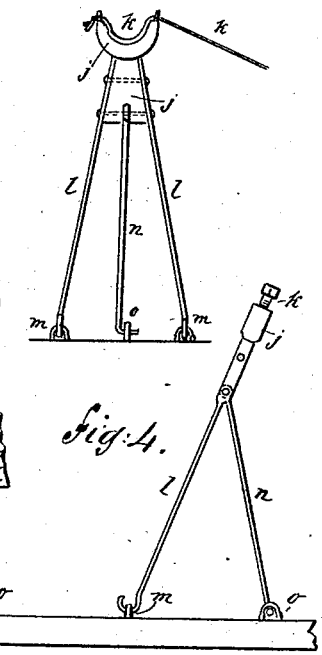
WITNESSES
Chas. Nida
C. Sedgwick
INVENTOR:
J. H. Lewis
BY Munn & Co
ATTORNEYS.

UNITED STATES PATENT OFFICE.

JAMES H. LEWIS, OF BISMARCK, ILLINOIS.

APPARATUS FOR SECURING ANIMALS WHILE BEING SHOD.

SPECIFICATION forming part of Letters Patent No. 305,202, dated September 16, 1884.

Application filed January 21, 1884. (No model.)

*To all whom it may concern:*

Be it known that I, JAMES H. LEWIS, of Bismarck, in the county of Vermilion and State of Illinois, have invented a new and Improved Apparatus for Securing Animals while being Shod, of which the following is a full, clear, and exact description.

Reference is to be had to the accompanying drawings, forming part of this specification, in which similar letters of reference indicate corresponding parts in all the figures.

Figure 1 is a side elevation of my improvement, partly in section. Fig. 2 is a rear elevation partly in section and part being broken away. Fig. 3 is a front elevation of one of the foot-rests. Fig. 4 is a side elevation of the same.

The object of this invention is to promote convenience and security in shoeing horses and other animals.

The invention consists in an apparatus for securing animals while being shod, constructed with hinged beams having posts and braces, and provided with bearings to receive rods attached to the ends of a strap or straps, one of the said rods being provided with a ratchet-wheel, pawls, and a lever, for tightening and loosening the said strap for supporting and releasing the animal. In an opening in the floor is secured a casing, within which is placed a platform supported upon cranks connected by other cranks and connecting-rods with a lever, so that the platform can be withdrawn from the animal's feet when he is to be shod, and returned when the shoeing is finished. The animal's feet, while being operated upon, are secured by a strap to a concaved block provided with two rigid legs and an adjustable hinged leg or brace, so that the rest can be inclined in either direction, as will be hereinafter fully described.

A represents the wall, and B the floor, of a blacksmith's shop or other building.

C are two beams, placed at such a distance apart as to readily receive between them the animal to be shod. The forward ends of the beams C are hinged to the wall A by eye-straps D E and pins F, or other suitable hinges that will allow the said beams to be readily detached when not in use.

To the rear ends of the beams C are framed the upper ends of posts G, upon the lower ends of which are formed tenons H, to enter mortises I in the floor B and hold the said posts in position. The rear ends of the beams C are strengthened against lateral movement by braces J, the upper ends of which are hinged to the outer sides of the rear parts of the said beams, and their lower ends are hooked into staples attached to the floor B.

K is a strap, one or more of which can be used, and which is attached at one end to a rod or shaft, L. The ends of the shaft L revolve in bearings M, attached to the outer side of one of the beams C, and to the said shaft is attached a ratchet-wheel, N, with the teeth of which engages the pawl O, pivoted to the lever P. The end of the lever P is pivoted to the shaft L. The rod L is held from being turned back when the rod is adjusted for another stroke by a holding-pawl, Q, pivoted to the bearing M, and engaging with the ratchet-wheel N, as shown in Fig. 2.

To the outer end of the strap K is attached a rod, R, the ends of which project so that they can be passed beneath hooks S, attached to the outer side of the other beam C.

In the floor B, between the beams C, is formed an opening, into which is fitted the top of a frame or casing, T.

Into the casing T is fitted a platform, U, which, when raised, serves as a continuation of the floor B. The platform U is kept from rising above the level of the floor B, and is kept from tilting, should the weight be placed upon it unevenly, by flanges V, formed upon or attached to the upper edges of the ends of the casing T, and which enter rabbets formed in the upper sides of the ends of the said platform U. The platform U is supported, when lowered, by cleats W, attached to the ends of the casing T.

To the lower side of the platform U are attached facing-plates X, which rest upon rollers Y, placed upon cranks Z. The cranks Z are pivoted in bearings *a* in the lower parts of the sides of the casing T, and upon their ends at one side of the casing T are formed, or upon them are attached, shorter cranks *b*. The cranks *b* are connected by a bar, *c*, so that they and the cranks Z will move together and will raise the platform U squarely.

To one of the cranks b is pivoted the end of a connecting-rod, d, the other end of which is pivoted to the lower end of a lever, e. The lever e is pivoted to a support, f, attached to the side of casing T, and its upper end projects into a slot in the floor B. The lever e is provided with a hand-piece, g, having a socket in its lower end to receive the upper end of the said lever e, so that the said hand-piece can be detached when the apparatus is not in use, leaving the floor unobstructed. The upper part of the lever e moves along a catch bar, h, attached to the side of the casing T, to lock the said lever in place when holding the platform raised. The movements of the levers b are limited by stops i, attached to the side of the casing T.

In using the apparatus the animal to be shod is led into the space between the beams C, so as to stand upon the platform U, and is tied to a ring or other device attached to the wall A or other support. The strap or straps K are then passed beneath the animal's body, the rod R is placed in the hooks S, and the lever P is operated to wind the strap K upon the rod L and bring the said strap K close to the body of the animal. The lever g e is then operated to lower the platform U, and the animal is left suspended upon the strap K. The animal's feet are then placed successively upon the concaved rest j, where they are secured by the strap k, passed through keepers formed upon the rest j at the ends of its concave.

To the shank of the rest j are bolted the upper ends of two rods, l, which incline from each other, and the lower ends of which are hinged to staples m or other supports attached to the floor B or to the upper edge of the casing T.

To the lower end of the shank of the rest j is hinged the upper end of the rod n, which serves as a third leg or brace to the rest j, and the lower end of which is hooked into a staple, o, attached to the floor B. Two staples, o, are used—one in front and the other in the rear of the staples m—so that the rest can be inclined forward or rearward, according as the animal's foot is to be supported in position for driving the nails or for clinching the nails and rasping the hoof. Four of the rests are designed to be used—one for each of the animal's feet; or four sets of staples and one rest may be used, the said rest being moved from one set to another as each foot is to be operated upon.

Having thus described my invention, what I claim as new, and desire to secure by Letters Patent, is—

1. In an apparatus for securing animals while being shod, the combination, with the beams C, of the hooks S, the strap K, provided with the rod R at one end, the shaft L, to which the other end of the said strap is attached, and means for winding the strap on the said shaft, substantially as herein shown and described.

2. In an apparatus for securing animals while being shod, the combination, with the hinged beams C and their posts and braces G J, of the strap K, rods L R, bearings M S, and ratchet-wheel N, pawls O Q, and lever P, substantially as herein shown and described, whereby the animal can be supported while being shod, as set forth.

3. In an apparatus for supporting animals while being shod, the combination, with the floor B, having an opening, of the casing T, the platform U, the cranks Z and b, the connecting-rods c d, and the lever e g, substantially as herein shown and described, whereby a support can be withdrawn from and returned to the animal's feet, as set forth.

4. In an apparatus for supporting animals while being shod, the foot-rest constructed substantially as herein shown and described, and consisting of the concaved block j, having staples, the strap k, the rigid legs l, and the adjustable leg or brace n, as set forth.

JAMES H. LEWIS.

Witnesses:
FRANCIS M. GUNDY,
OBADIAH PHILLIPS.